Patented Aug. 1, 1939

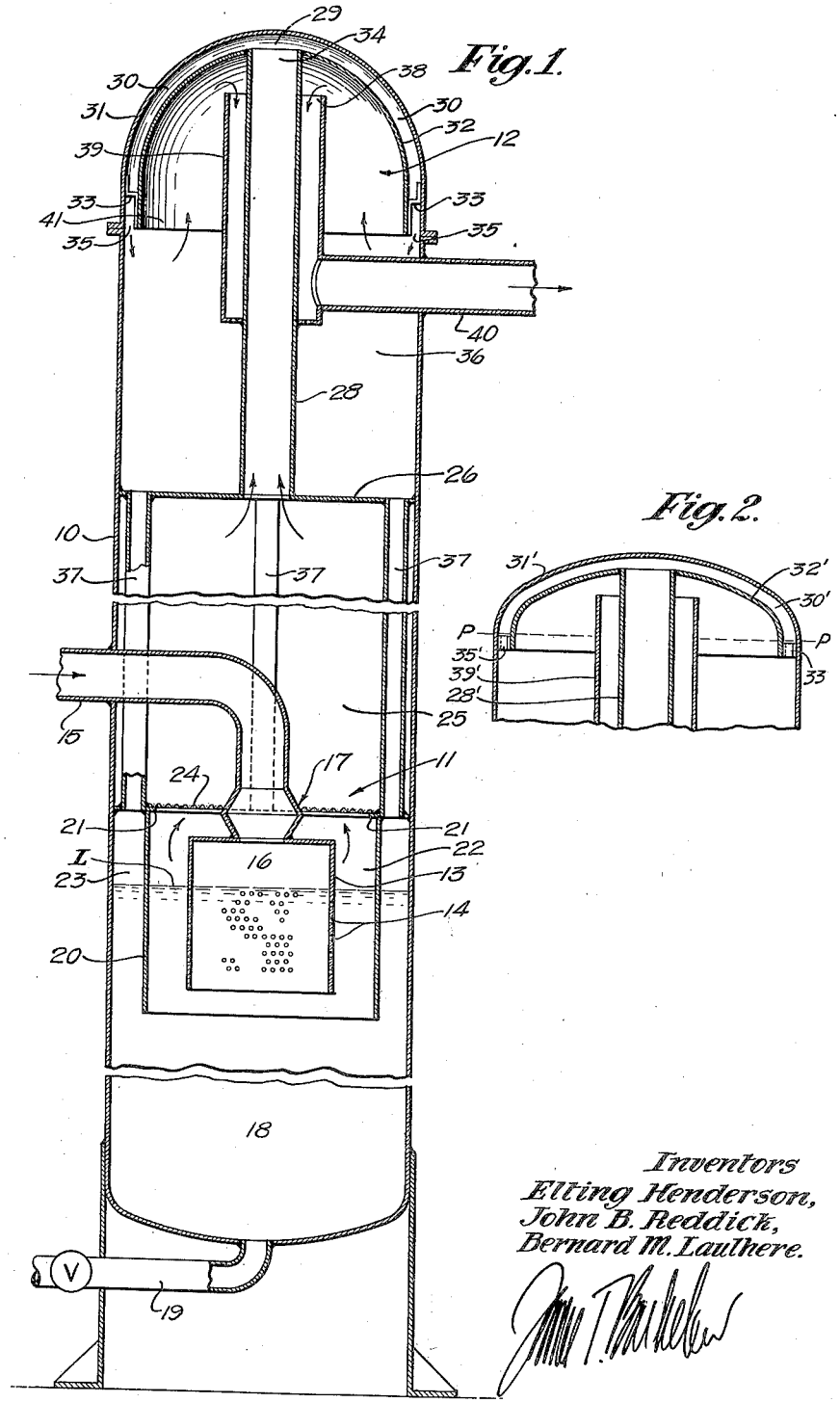

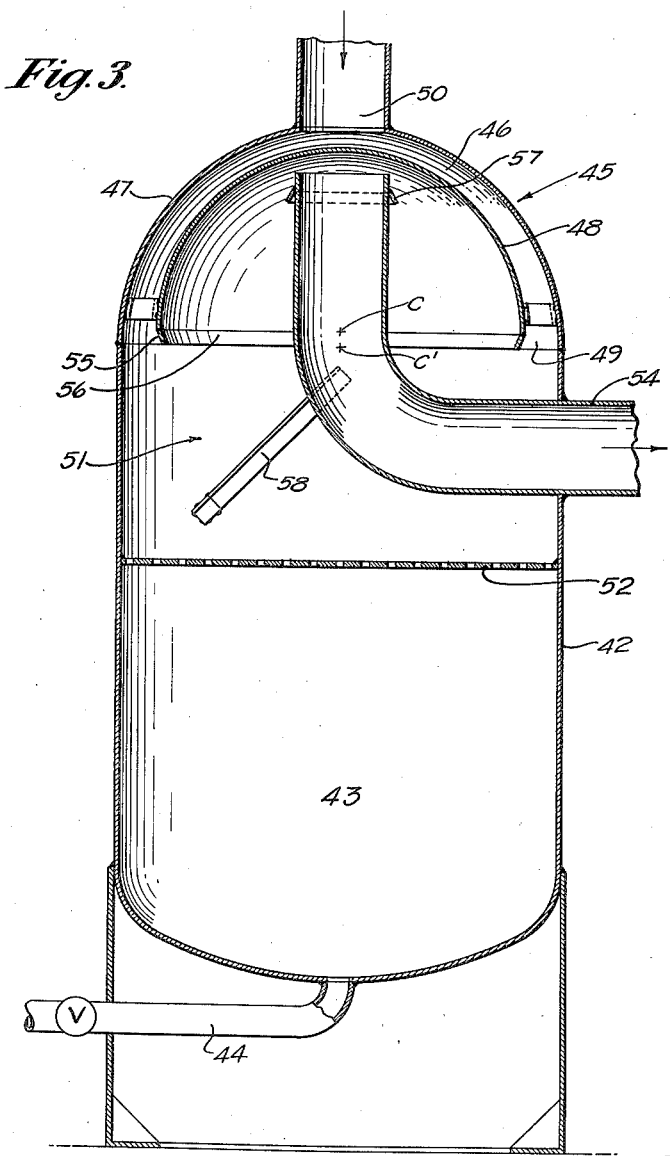

2,167,839

UNITED STATES PATENT OFFICE 2,167,839

SEPARATOR

Elting Henderson, Huntington Park, John B. Reddick, Los Angeles, and Bernard M. Laulhere, Walnut Park, Calif., assignors to The Fluor Corporation, Ltd., Los Angeles, Calif., a corporation of California Application March 5, 1938, Serial No. 194,118

5 Claims. (Cl. 183—107)

This invention has to do with separators for removing liquid or dust entrainment from gas, and in certain of its aspects relates to improvements in the type of separators disclosed in Patent No. 2,102,705, issued December 21, 1937, to Elting Henderson and John B. Reddick on Separator. Our major object is to increase the entrainment removing efficiency of this type of separator, and also to materially reduce its construction costs. As will appear, the invention is applicable to apparatus for separating liquid and gaseous mixtures generally, and also to combined liquid and dust separators.

In the present form of liquid separator the wet gas is discharged axially or centrally into an annular separating passage extending downwardly and outwardly from a point of gas entry, the separating passage being formed between curved walls, one of which preferably is formed by the outer casing, whose shape characteristics produce an initial efficient entrainment removing effect upon the gas. By virtue of the shape of the separating passage, we obtain a centrifugal movement of the gas in all directions about its point of entry to the passage, causing the entrainment to be thrown outwardly and maintained against the drain surface of the outer passage wall. Additional entrainment removing effects exist in the separating passage, but these can later be explained to better advantage in the more specific description of the apparatus.

After leaving the separating passage, the gas enters an enlarged chamber wherein the gas velocity is maintained below its entrainment velocity, causing gravity separation of mist particles remaining in the gas. The gas thereupon is caused to reverse its flow, thus giving a further separating effect, and to pass upwardly within a chamber inside the inner separating passage wall, to an outlet located preferably at an elevated point in that chamber. The dry gas then is suitably discharged from the separator, preferably through a pipe extending downwardly within the last mentioned chamber and outwardly through the shell or casing below the separating passage.

The invention also includes various other improvements, as in the dust extraction assembly in a combined liquid and dust separator, but all these, as well as the features mentioned in the foregoing, will best be understood from the following detailed description of the invention in certain of its typical and illustrative forms. Throughout the description reference is had to the accompanying drawings, in which:

Fig. 1 is a vertical sectional view illustrating one form of the invention embodying a combination of dust and liquid extraction means;

Fig. 2 is a fragmentary section showing a variational form of the invention; and Fig. 3 is a view similar to Fig. 1, showing a modified form of the invention in a liquid and gas separator.

Referring first to Fig. 1, the separator comprises a somewhat vertically elongated casing 10 containing a dust extracting assembly generally indicated at 11, from which the gas passes upwardly within the casing to a liquid separator, generally indicated at 12, at the upper end of the shell. The dust extractor assembly 11 comprises a cylindric, open bottomed shell 13 concentric with the casing 10 having side wall perforations 14. Gas containing dust and perhaps also liquid entrainment is discharged from the inlet pipe 15 downwardly and centrally into the chamber 16 within the upper interior of shell 13, the gas stream flowing through nozzle 17 that initially confines the gas stream to the central portion of the shell. The bottom chamber 18 within the casing contains a suitable dust retaining liquid, preferably a low vapor pressure oil, that normally stands at a level L at or above the uppermost shell perforations 14 so that the gas introduced to chamber 16 will depress the liquid level in the shell and flow outwardly through the perforations above the depressed level.

A suitable valved line 19 may be provided for draining liquid from chamber 18. In addition to maintaining the gas stream in a central path of flow within chamber 15, nozzle 17 discharges the gas at a velocity sufficiently high that the dust particles will become projected into and retained by the body of liquid.

Cylindric imperforate wall 20 supported by annular flange 21, or in any other suitable manner, is positioned concentrically within the casing and spaced from the shell 13 to form an annular gas passage 22 and an outer liquid displacement or surge chamber 23. The upper end of the cylindric wall 20 preferably is closed about the nozzle 17 by a suitable perforated wall 24, which may conveniently be formed of screen. The gas being discharged outwardly through the shell perforations 14 flows upwardly within passage 22 in contact with liquid standing therein at a level above the depressed liquid level within the shell, the liquid in passage 22 being frothed considerably by the large number of fine gas streams jetted outwardly from the perforations, so that intimate contact is maintained between the liquid and gas to extract all traces of dust from the gas. Screen 24 serves to assist in breaking any oil froth rising to its level, and also to inhibit the carrying of liquid entrainment by the gas flowing upwardly through chamber 25 between the screen and plate 26 to the liquid separator 12. As a further means for preventing the separator 12 from becoming overloaded by excessive liquid entrainment carried in the gas stream leaving the lower dust extracting unit, the casing diameter may be made sufficiently large that the gas will flow upwardly through chamber 25 at a velocity so low that excessive entrainment will settle out of the gas.

The principal feature of importance in the dust extraction unit 11 is the provision of a chamber to accommodate some of the liquid that otherwise would all be displaced into passage 22 as the liquid level is depressed within shell 13. While it is necessary to maintain the liquid level in passage 22 as high as the uppermost perforations 14, the liquid should not extend greatly above that level, since thoroughly intimate contact between the liquid and gas will be obtained opposite the perforations and the effect of extending the liquid column considerably above the perforations is to increase the tendency of the gas to become loaded with liquid entrainment. Accordingly, we provide a chamber into which at least a portion of the liquid from chamber 16 is displaced. Although broadly considered, any suitable displacement chamber may be provided, we may conveniently utilize for this purpose the chamber 23 formed by annularly spacing the imperforate wall 20 from the casing 10. As will be understood, the liquid levels in passage 22 and chamber 23 will be the same, except for the tendency of the gas stream to somewhat elevate the liquid level in passage 22. However, the horizontal cross sectional area between the casing and shell 13 will be sufficient to accommodate the liquid displaced from the shell without excessively increasing the height of the liquid level above the perforations.

The gas leaving chamber 25 flows upwardly through pipe 28 into the axial center 29 of an annular separating passage 30 that is curved downwardly and outwardly about the point of gas entry 29. In the preferred embodiment of the invention, passage 30 is formed between the hemi-spherical head 31 of the shell and a smaller radius but correspondingly shaped wall 32 supported on brackets 33 and the upper end of pipe 28. A number of effects tending to remove entrainment from the gas, occur during and as a result of the downward and outward gas flow through the separating passage 30. In the first place it will be noted that the passage has sufficient extent and curvature that the liquid particles carried by the gas must necessarily repeatedly impinge against the walls of the passage during the course of flow from the inlet 34 to the annular passage outlet 35 at the lower end of wall 32. Consequently, any liquid particles once deposited on the passage walls and reentrained in the gas stream, are repeatedly projected against the passage walls and recollected thereon. Also, the gas stream is given a downward centrifugal motion, causing the entrained particles to be thrown outwardly against the inner surface of the head 31 and, by the same effects, to be maintained against that surface, thus resisting reentrainment of particles that have been deposited on the surface. The width of the separating passage 30, as determined by the spacing of head 31 and wall 32, is sufficient to maintain gas velocities within the passage that are high enough to produce the effects described above, but yet which are sufficiently low to prevent excessive reentrainment, as would result from too high velocities, at least toward the outlet end 35 of the passage. The entrainment removed from the gas during its flow through the separating passage is largely deposited on the surface of the head 31, from which the liquid drains down along the inner surface of the casing.

A further separating effect results from the fact that as the gas flows downwardly through the separating passage, the gas velocity progressively decreases due to the progressive increase in the annular cross sectional area of the passage in the direction of gas flow. Consequently, the heavier particles of liquid entrainment tend to precipitate from the gas and at the same time to deposit on the outer wall of the passage by reason of the downward centrifugal motion given the gas stream as previously described.

The annular gas stream discharged from the separating passage outlet 35 flows into an enlarged chamber 36 between the casing and pipe 28, wherein the gas, by virtue of its greatly and suddenly reduced velocity, is freed from entrainment that may still remain in the gas. The separated liquid within chamber 36 drains through tubes 37, out of contact with the gas stream in chamber 25, into the upper end of the annular displacement chamber 23. Upon entering chamber 36, the gas discharged from the separating passage completely reverses its direction of flow and passes upwardly within wall 32, preferably to a point near its upper end, into gas outlet 38 formed by pipe 39 placed about pipe 28, and connecting with a discharge pipe 40 extending through the wall of the casing. The area of the annular space at 41 between pipe 39 and the lower end of wall 32 is made sufficiently large that immediately after its reversal of flow, the gas passes upwardly within wall 32 at a velocity below the entrainment velocity of the gas, i. e. at a velocity below that at which the gas will carry entrained particles of appreciable size. The gas then flows at increasing velocity to the outlet 38, but without the opportunity for causing reentrainment since the combined effects of the separating passage 30, reduction of gas velocity and reversal of flow in chamber 36, and the maintenance of sub-entrainment velocity at 41, will have depleted the gas of all entrainment before it has again reached a stage of high velocity flow.

While generally, and for most efficient liquid separation, we prefer to form the separating passage between concentric hemi-spherical walls as described with reference to Fig. 1, a high degree of liquid separation may be accomplished by forming the passage between walls having other than hemi-spherical shape, providing the walls have sufficient downward curvature and extent to maintain the described factors entering into liquid separation within the passage. For best results we prefer that the separating passage have an angular extent of at least substantially 180°. With reference to other possible forms of curvature, we show in Fig. 2 a separating passage 30' to be formed by a head 31' and spaced inner wall 32' both substantially ellipsoidal in shape, and each having an angular extent of 180° above a plane P through their common axis.

Fig. 3 shows a simple form of liquid and gas separator embodying the invention, without the dust extractor feature of the first described form. Here the casing 42 contains a lower liquid chamber 43 having a draw-off line 44, and a liquid separator assembly 45 generally similar to that described with reference to Fig. 1. The separating passage 46 is formed between the hemispherical head 47 of the casing and the inner spaced wall 48 which is also hemi-spherical but has its center C of curvature offset somewhat above the curvature center C' of head 47, so that in vertical cross section the separating passage has a gradual and slight divergence toward its outlet end 49.

The gas introduced to passage 46 through an inlet 50 in axial alinement with the axial center of the passage, flows downwardly through the passage and is discharged into an enlarged chamber 51 separated from chamber 43 by a suitable fluid passing wall or partition, such as perforated plate 52. The latter is provided for the purpose of isolating from the path of the gas stream, the chamber 43 into which the separated liquid drains. Leaving chamber 51, the gas reverses its direction of flow and passes upwardly within the interior wall 48 into the outlet end 53 of a discharge pipe 54 supported by braces 58. Annular baffle 55, turned inwardly from the lower edge of wall 48, prevents the gas stream rising through space 56 from reentraining liquid from the outlet end 49 of the separating passage. A second baffle 57 may be placed about the upper end of pipe 54 to prevent any liquid that may become swept up along the outer surface of the pipe, from entering the outlet 53. The operation of the separator assembly 45 in Fig. 3 is similar to the separator unit 12 previously described in detail with reference to Fig. 1, as will be understood without the necessity of further description.

We claim:

1. In a separator of the character described, a vertically extending shell, spaced inner and outer walls curved downwardly and outwardly about a chamber enclosed within and defined by said inner wall, said chamber having upwardly decreasing horizontal cross sectional area, said outer wall being an upper continuation of the shell and forming with said inner wall an annular separating passage having an upper inlet end and a lower outlet end communicating with said chamber, said passage having progressively increasing cross sectional area from its inlet end to said outlet end and an extended curvature of at least about 180° such that liquid entrainment in the gas flowing at progressively reduced velocity through the passage is thrown centrifugally against said outer wall, means forming a gas outlet within the upper interior of said chamber a substantial distance above the bottom of said inner wall, and means for passing gas downwardly through said separating passage into an enlarged space within the shell below said chamber, the gas then reversing its flow and passing upwardly at increasing velocity within said chamber to said outlet.

2. In a separator of the character described, a vertically extending shell, spaced inner and outer walls of annular horizontal cross section, said walls being curved downwardly and outwardly about a chamber enclosed within and defined by said inner wall, said chamber having upwardly decreasing horizontal cross sectional area, said outer wall being an upper continuation of the shell and forming with said inner wall an annular separating passage having an upper inlet end and a lower outlet end communicating with an enlarged space within the shell below said chamber, said separating passage having progressively increasing cross sectional area from its inlet end to said outlet end and having in vertical cross section an arcuate extent of at least about 180°, means forming a gas outlet within the upper interior of said chamber a substantial distance above the bottom of said inner wall, and means for passing gas downwardly through said separating passage wherein the gas flows at progressively decreasing velocity and liquid entrainment in the gas is thrown centrifugally outward against said outer wall, the gas then entering an enlarged space within the shell below said chamber and finally reversing its flow and passing upwardly at increasing velocity within said chamber to said outlet.

3. In a separator of the character described, a vertically extending shell, spaced inner and outer walls of annular horizontal cross section and curved downwardly and outwardly about a chamber surrounded by said inner wall, said outer wall being an upper continuation of the shell and forming with said inner wall an annular separating passage having an upper inlet end and a lower outlet end, said passage having progressively increasing cross sectional area from its inlet end to said outlet end and having in vertical cross section an arcuate extent of at least about 180°, means forming a gas outlet within the upper interior of said chamber a substantial distance above the bottom of said inner wall, and means for passing gas downwardly through said separating passage wherein the gas flows at progressively decreasing velocity and liquid entrainment in the gas is thrown centrifugally outward against said outer wall, the gas then flowing into an enlarged space in the shell below said chamber and within which the gas velocity is maintained below the entrainment velocity, the gas finally reversing its flow in passing upwardly to said outlet.

4. In a separator of the character described, a vertically extending shell, spaced inner and outer substantially hemispherical walls extending downwardly and outwardly about a chamber surrounded by said inner wall, said outer wall being an upper continuation of the shell and forming with said inner wall an unobstructed annular separating passage of semi-circular curvature open at its lower end and of progressively increasing horizontal cross sectional area toward said lower end, means forming a gas outlet within the upper interior of said chamber a substantial distance above the bottom of said inner wall, and means for passing gas downwardly through said separating passage wherein the gas flows at progressively decreasing velocity and liquid entrainment in the gas is thrown centrifugally outward against said outer wall, the gas thence flowing into an enlarged space in the shell and within which the gas velocity is maintained below the entrainment velocity, the gas finally reversing its flow in passing to said outlet.

5. In a separator of the character described, a vertically extending shell, spaced inner and outer walls of annular horizontal cross section and curved downwardly and outwardly about a chamber surrounded by said inner wall, said outer wall being an upper continuation of the shell and forming with said inner wall an annular separating passage having an upper inlet end and a lower outlet end, said passage having progressively increasing cross sectional area from its inlet end to said outlet end, the passage having in vertical cross section an extended arcuate shape, a gas discharge pipe having an inlet positioned within the upper interior of said chamber a substantial distance above the bottom of said inner wall, said pipe having a vertical portion extending downwardly within the chamber and a lateral portion extending through the side wall of said shell, a gas inlet pipe extending upwardly through said vertical portion of the discharge pipe into the top of said separating passage, the gas discharged from the inlet pipe flowing downwardly through the separating passage at progressively decreasing velocity and liquid entrainment in the gas being thrown centrifugally outward against said outer wall, the gas thence flowing into an enlarged space in the shell below said chamber and within which the gas velocity is maintained below the entrainment velocity, the gas finally reversing its flow in passing upwardly to said discharge pipe inlet.

ELTING HENDERSON.
JOHN B. REDDICK.
BERNARD M. LAULHERE.